US008386346B2

(12) United States Patent
Magner et al.

(10) Patent No.: US 8,386,346 B2
(45) Date of Patent: Feb. 26, 2013

(54) ACTIVITY BASED COSTING UNDERWRITING TOOL

(75) Inventors: Kathryn A. Magner, North Reading, MA (US); Laurie Mahoney, North Andover, MA (US); Shelley Smith, Lafayette, CA (US); Gail E. McGiffin, Summit, NJ (US); Kevin W. MacIntosh, Randolph, NJ (US); Steven I. Kauderer, Englewood, NJ (US)

(73) Assignee: Accenture Global Services Limited, Dublin (IE)

( * ) Notice: Subject to any disclaimer, the term of this patent is extended or adjusted under 35 U.S.C. 154(b) by 1437 days.

(21) Appl. No.: 10/546,973

(22) PCT Filed: Mar. 1, 2004
(Under 37 CFR 1.47)

(86) PCT No.: PCT/EP2004/002066
§ 371 (c)(1),
(2), (4) Date: Apr. 20, 2007

(87) PCT Pub. No.: WO2004/077198
PCT Pub. Date: Sep. 10, 2004

(65) Prior Publication Data
US 2008/0040168 A1    Feb. 14, 2008

(30) Foreign Application Priority Data

Feb. 28, 2003  (US) .................................. 10/377,147

(51) Int. Cl.
G06Q 40/00 (2012.01)
G06F 15/02 (2006.01)
G07C 1/10 (2006.01)

(52) U.S. Cl. .......................................... 705/35; 705/32

(58) Field of Classification Search .................... 705/35, 705/32
See application file for complete search history.

(56) References Cited

U.S. PATENT DOCUMENTS 4,847,791 A  7/1989  Martin et al.
5,249,120 A  9/1993  Foley
(Continued)

FOREIGN PATENT DOCUMENTS

CA     2 332 938    12/1999
WO    WO 99/41707   8/1999
(Continued)

OTHER PUBLICATIONS

Work and Resource Breakdown by Rad Parviz F; Cost Engineering vol. 46-2 Feb. 2004, pp. 31-37.*

(Continued)

Primary Examiner — Matthew Gart
Assistant Examiner — Harshad Parikh
(74) Attorney, Agent, or Firm — Brinks Hofer Gilson & Lione

(57) ABSTRACT

A method of evaluating underwriting activities of a company providing insurance coverage is disclosed. The method comprises the steps of storing data related to the underwriting activities for the company; receiving information from employees related to tasks associated with the underwriting activities; analyzing the information from the employees; and generating a report based upon the information from employees. A system for evaluating underwriting activities for a company is also disclosed. The system comprising a user computer storing a program containing questions related to tasks for underwriting activities; a server coupled to the user computer to receive information entered by a plurality of users related to tasks for underwriting activities; and a report generated by the server and providing analyzed information related to responses of the plurality of users.

14 Claims, 12 Drawing Sheets

U.S. PATENT DOCUMENTS

| | | | |
|---|---|---|---|
| 5,429,506 | A | 7/1995 | Brophy et al. |
| 5,600,554 | A | 2/1997 | Williams |
| 5,606,497 | A * | 2/1997 | Cramer et al. ............... 705/32 |
| 5,634,055 | A | 5/1997 | Barnewall et al. |
| 5,684,964 | A | 11/1997 | Powers et al. |
| 5,697,844 | A * | 12/1997 | Von Kohorn ............... 463/40 |
| 5,732,401 | A | 3/1998 | Conway |
| 5,734,592 | A | 3/1998 | Cox et al. |
| 5,799,286 | A | 8/1998 | Morgan et al. |
| 5,809,478 | A * | 9/1998 | Greco et al. ............... 705/4 |
| 5,819,231 | A | 10/1998 | Tremaine |
| 5,842,182 | A | 11/1998 | Bonner et al. |
| 5,873,066 | A * | 2/1999 | Underwood et al. ............ 705/4 |
| 5,884,275 | A | 3/1999 | Peterson et al. |
| 5,893,074 | A | 4/1999 | Hughes et al. |
| 5,909,672 | A | 6/1999 | Madore et al. |
| 5,966,693 | A | 10/1999 | Burgess |
| 5,991,733 | A * | 11/1999 | Aleia et al. ............... 705/7.13 |
| 5,991,742 | A * | 11/1999 | Tran ............... 705/32 |
| 6,032,123 | A | 2/2000 | Jameson |
| 6,038,554 | A | 3/2000 | Vig |
| 6,049,773 | A * | 4/2000 | McCormack et al. ............ 705/4 |
| 6,056,428 | A * | 5/2000 | Devoino et al. ............... 703/2 |
| 6,067,525 | A | 5/2000 | Johnson et al. |
| 6,081,900 | A | 6/2000 | Subramaniam et al. |
| 6,092,047 | A | 7/2000 | Hyman et al. |
| 6,119,097 | A * | 9/2000 | Ibarra ............... 705/7.42 |
| 6,185,514 | B1 * | 2/2001 | Skinner et al. ............... 702/188 |
| 6,189,029 | B1 | 2/2001 | Fuerst |
| 6,267,671 | B1 | 7/2001 | Hogan |
| 6,269,355 | B1 | 7/2001 | Grimse et al. |
| 6,282,514 | B1 | 8/2001 | Kumashiro |
| 6,338,042 | B1 | 1/2002 | Paizis |
| 6,356,875 | B1 | 3/2002 | Green et al. |
| 6,377,938 | B1 * | 4/2002 | Block et al. ............... 705/32 |
| 6,442,567 | B1 * | 8/2002 | Retallick et al. ............ 705/7.27 |
| 6,456,979 | B1 * | 9/2002 | Flagg ............... 705/4 |
| 6,519,763 | B1 | 2/2003 | Kaufer et al. |
| 6,556,974 | B1 | 4/2003 | D'Alessandro |
| 6,578,013 | B1 | 6/2003 | Davis et al. |
| 6,604,080 | B1 | 8/2003 | Kern |
| 6,622,128 | B1 * | 9/2003 | Bedell et al. ............... 705/30 |
| 6,625,647 | B1 | 9/2003 | Barrick, Jr. et al. |
| 6,640,302 | B1 | 10/2003 | Subramaniam et al. |
| 6,651,012 | B1 * | 11/2003 | Bechhoefer ............... 702/34 |
| 6,714,914 | B1 | 3/2004 | Peters et al. |
| 6,732,079 | B1 | 5/2004 | Kintner et al. |
| 6,735,569 | B1 | 5/2004 | Wizig |
| 6,735,585 | B1 | 5/2004 | Black et al. |
| 6,766,319 | B1 | 7/2004 | Might |
| 6,766,322 | B1 | 7/2004 | Bell |
| 6,823,315 | B1 | 11/2004 | Bucci et al. |
| 6,850,895 | B2 | 2/2005 | Brodersen et al. |
| 6,862,596 | B2 | 3/2005 | Thomsen |
| 6,970,831 | B1 | 11/2005 | Anderson et al. |
| 6,976,002 | B1 | 12/2005 | Ferguson et al. |
| 7,013,284 | B2 | 3/2006 | Guyan et al. |
| 7,210,119 | B2 * | 4/2007 | Pothos et al. ............... 717/102 |
| 7,277,861 | B1 * | 10/2007 | Benson et al. ............... 705/4 |
| 7,349,869 | B2 * | 3/2008 | Oakeson et al. ............ 718/105 |
| 7,376,647 | B1 * | 5/2008 | Guyan et al. ............... 707/748 |
| 7,478,063 | B2 * | 1/2009 | Knight ............... 705/36 R |
| 7,624,051 | B2 * | 11/2009 | Gellman ............... 705/35 |
| 7,689,443 | B2 * | 3/2010 | Pepoon et al. ............... 705/4 |
| 7,765,218 | B2 * | 7/2010 | Bates et al. ............... 707/752 |
| 8,170,902 | B2 * | 5/2012 | Kennis et al. ............... 705/7.28 |
| 8,271,305 | B2 * | 9/2012 | McGiffin et al. ............... 705/4 |
| 2001/0008999 | A1 * | 7/2001 | Bull ............... 705/11 |
| 2001/0034630 | A1 | 10/2001 | Mayer et al. |
| 2002/0035506 | A1 | 3/2002 | Loya |
| 2002/0046073 | A1 | 4/2002 | Indseth et al. |
| 2002/0046210 | A1 | 4/2002 | Thomsen |
| 2002/0069031 | A1 * | 6/2002 | Lehman ............... 702/178 |
| 2002/0069077 | A1 * | 6/2002 | Brophy et al. ............... 705/1 |
| 2002/0069145 | A1 * | 6/2002 | Collado et al. ............... 705/32 |
| 2002/0087364 | A1 * | 7/2002 | Lerner et al. ............... 705/4 |
| 2002/0091550 | A1 * | 7/2002 | White et al. ............... 705/4 |
| 2002/0091610 | A1 * | 7/2002 | Smith ............... 705/36 |
| 2002/0103798 | A1 * | 8/2002 | Abrol et al. ............... 707/5 |
| 2002/0133503 | A1 * | 9/2002 | Amar et al. ............... 707/104.1 |
| 2002/0147668 | A1 * | 10/2002 | Smith et al. ............... 705/30 |
| 2002/0165749 | A1 * | 11/2002 | Northcutt et al. ............... 705/8 |
| 2002/0174134 | A1 * | 11/2002 | Goykhman ............... 707/104.1 |
| 2003/0028413 | A1 * | 2/2003 | White et al. ............... 705/10 |
| 2003/0046169 | A1 * | 3/2003 | Fraser et al. ............... 705/26 |
| 2003/0061096 | A1 * | 3/2003 | Gallivan et al. ............... 705/14 |
| 2003/0074287 | A1 * | 4/2003 | Shuder et al. ............... 705/32 |
| 2003/0088452 | A1 | 5/2003 | Kelly |
| 2003/0125992 | A1 * | 7/2003 | Rogers et al. ............... 705/5 |
| 2003/0126048 | A1 * | 7/2003 | Hollar et al. ............... 705/30 |
| 2003/0144932 | A1 * | 7/2003 | Martin et al. ............... 705/32 |
| 2003/0167193 | A1 * | 9/2003 | Jones et al. ............... 705/7 |
| 2003/0179908 | A1 * | 9/2003 | Mahoney et al. ............... 382/112 |
| 2003/0191700 | A1 * | 10/2003 | Horne et al. ............... 705/32 |
| 2003/0221118 | A1 * | 11/2003 | Walker ............... 713/193 |
| 2004/0024620 | A1 | 2/2004 | Robertson et al. |
| 2004/0093257 | A1 | 5/2004 | Rogers et al. |
| 2004/0128182 | A1 * | 7/2004 | Pepoon et al. ............... 705/9 |
| 2004/0138950 | A1 | 7/2004 | Hyman et al. |
| 2004/0172311 | A1 * | 9/2004 | Kauderer et al. ............... 705/4 |
| 2005/0187799 | A1 * | 8/2005 | McGiffin et al. ............... 705/4 |
| 2006/0047540 | A1 * | 3/2006 | Hutten et al. ............... 705/4 |
| 2006/0085245 | A1 * | 4/2006 | Takatsuka et al. ............... 705/9 |
| 2006/0195379 | A1 * | 8/2006 | Abecassis et al. ............... 705/35 |
| 2006/0265254 | A1 * | 11/2006 | Witkowski et al. ............... 705/4 |
| 2007/0005401 | A1 * | 1/2007 | Vinyard ............... 705/4 |
| 2008/0033791 | A1 * | 2/2008 | Jones et al. ............... 705/11 |
| 2008/0040168 | A1 * | 2/2008 | Magner et al. ............... 705/7 |
| 2008/0114620 | A1 * | 5/2008 | Donnelli ............... 705/4 |
| 2008/0270240 | A1 * | 10/2008 | Chu ............... 705/14 |
| 2010/0121686 | A1 * | 5/2010 | Mahadevan et al. ............... 705/11 |
| 2010/0174578 | A1 * | 7/2010 | Duffy et al. ............... 705/9 |
| 2010/0205015 | A1 * | 8/2010 | McGiffin et al. ............... 705/4 |
| 2010/0287022 | A1 * | 11/2010 | Pfeiffer et al. ............... 705/9 |
| 2010/0318383 | A1 * | 12/2010 | Hargroder ............... 705/4 |
| 2011/0040582 | A1 * | 2/2011 | Mullins ............... 705/4 |
| 2011/0066575 | A1 * | 3/2011 | Taylor Dobane ............... 705/500 |
| 2011/0258012 | A1 * | 10/2011 | Bhatnagar et al. ............... 705/7.15 |
| 2011/0276396 | A1 * | 11/2011 | Rathod ............... 705/14.49 |
| 2011/0313802 | A1 * | 12/2011 | Timothy et al. ............... 705/7.13 |
| 2012/0109794 | A1 * | 5/2012 | Nathanson et al. ............... 705/32 |
| 2012/0143733 | A1 * | 6/2012 | Kappauf ............... 705/32 |
| 2012/0246039 | A1 * | 9/2012 | Fain et al. ............... 705/32 |

FOREIGN PATENT DOCUMENTS

WO        WO 02/07367   A2     1/2002

OTHER PUBLICATIONS

Derfler, Frank J. et al. How Networks Work, Millennium Ed., Que Corporation, Jan. 2000.
White, Ron, How Computers Work Millennium Ed., Que Corporation, Sep. 1999.
Gralla, Preston, How the Internet Works, Millennium Ed., Que Corporation, Aug. 1999.
UpShot Online Admin Guide, from UpShot.com 1999.
Timeslips Deluxe, Getting the Most from Timeslips, Timeslips Corporation, 1995.
Muller, Nathan J., Desktop Encyclopedia of the Internet, Artech House, Inc., 1998.
Borland's Paradox for Window's User's Guide, Borland International, Inc. 1994.
Greene, James H., Editor-in-Chief, Production and Inventory Control Handbook, 3rd Ed., McGraw-Hill Companies, Inc., 1997.
Riley, David D., Data Abstraction and Structure, An Introduction to Computer Science II, Boyd and Fraser Publishing Company, 1987.
Borland's ReportSmith for Windows User's Guide, Borland International, Inc. 1994.
Bragg, Steven M., Accounting Best Practices, John Wiley and Sons, Inc., 1999.
Andy Feibus, "Automated Time-Trackers Tenrox's Office Timesheet 2000 and Sage U.S.'s Timesheet Professional help employees keep track of their projects and help companies better manage workers and their expense reports," (Jul. 5, 1999) online as of May 26, 2006; informationweek.com http://www.informationweek.com/742/42oltrk.htm>.

Office Action issued in corresponding Australian application No. 2004214653 dated Sep. 8, 2009.

Office Action issued in corresponding Australia Appln. No. 2004214653 on Sep. 29, 2010 (2 pgs).

* cited by examiner

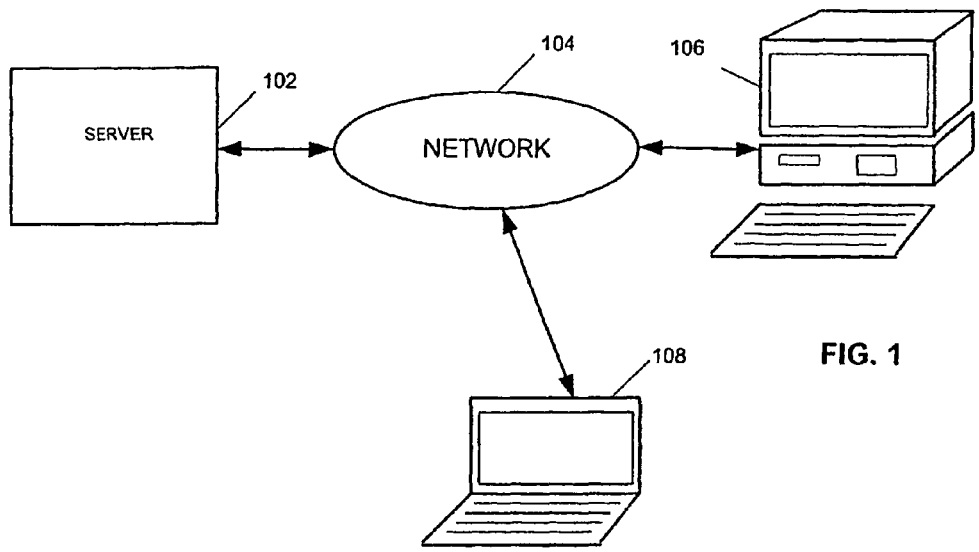
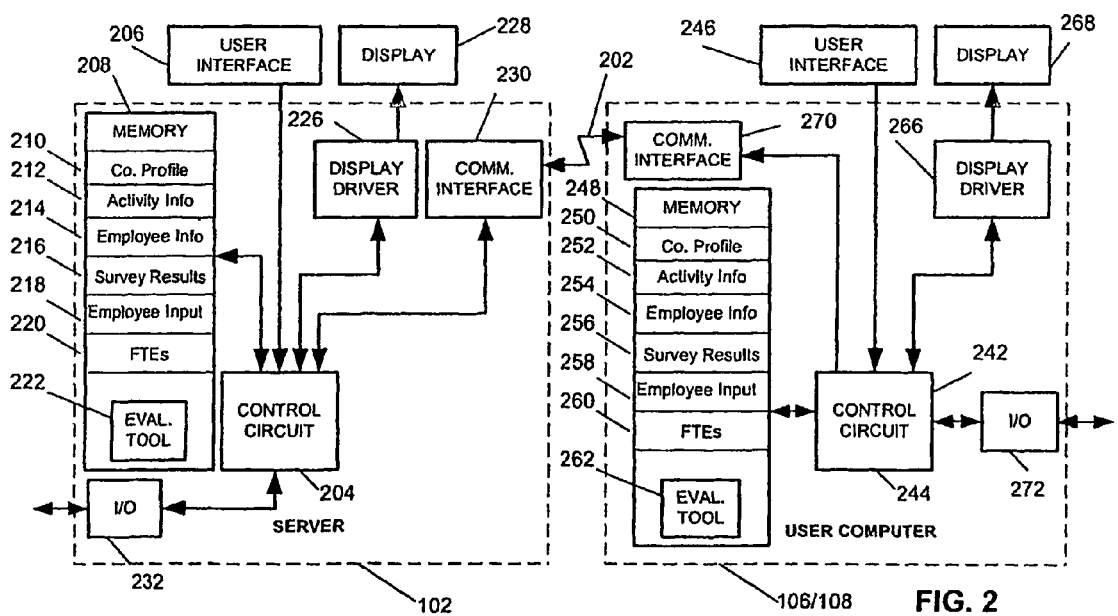
FIG. 1
FIG. 2

FIG. 10

| General Information | | | | | |
|---|---|---|---|---|---|
| Office/Branch: | | | Years of Industry Experience: | | |
| LOB(s): | | | Years employed with Company: | | |
| Average hours worked per week? | | | Years in current Position: | | |
| If a Supervisor or Manager, how many people do you oversee? | | | | | |
| Task ID | Task Description | Sub Tasks | Phone | I perform this task | High/Med/Low | Rank 1-15 |
| 1 | NB-Received/Input Application Information | Retrieve upload, retrieve fax/mail, retrieve web application, enter application information in CLASS system or other systems | Account Initiation | | | |
| 2 | NB-Clear/register/index application for producer/agency | Verify SIC/NAICS, verify customer name/address, determine product needs, assign underwriter/department/branch, verify no conflicting submissions, check for dead files, assign agency, retrieve registration/control numbers, check if terminated agent, check agency tier | Account Initiation | | | |
| 3 | NB-Assign Underwriter/Underwriting Team | Assign underwriters/team according to product requests/needs, router application to appropriate individuals | Account Initiation | | | |
| 4 | NB-Review application for completeness/accuracy and determine additional information needs | Check for missing information according to required information needs, verify data, identify data incongruence | Identify & Evaluate Exposure | | | |
| 5 | NB-Gather additional information from producer | Discuss application w/producer Request additional information (call, email, fax) Receive additional info., Reconcile/Verify Information received Update information into file Loss runs Financial information Fill out supplemental application | Identify & Evaluate Exposure | | | |
| 6 | NB-Request External Information – MVRs | Collect driver information, enter into report order form, send to external service (eg., ChoicePoint), suspend for follow-up, retrieve/enter results | Identify & Evaluate Exposure | | | |

FIG. 13

Underwriter Position Costs

| Phase | Core Non-Core | Task # | Task Description | Percent of Time | FTE's | Cost |
|---|---|---|---|---|---|---|
| Account Initiation | O | 1 | NB – Receive/Input Application information | 0/00% | 0 | $428.04 |
| Account Initiation | O | 2 | NB – Clear/register/index application for producer/agency | 0.00% | 0 | $34.24 |
| Account Initiation | O | 39 | EN – Receive Request | 0.66% | 0.05 | $4,177.68 |
| Account Initiation | O | 59 | RE – Identify Manual Renewal Policies | 0.40% | 0.03 | $2,080.28 |
| Total Account Initiation | | | | 1.06% | 0.08 | $6,720.24 |
| Administration | O | 98 | GEN – Participate in training programs | 0.40% | 0.03 | $2,174.45 |
| Administration | O | 99 | GEN – Conduct Internal Training | 0.26% | 0.02 | $1,891.94 |
| Administration | O | 101 | GEN – Distribute loss runs | 0.00% | 0 | $25.68 |
| Administration | O | 104 | GEN – Open mail | 0.00% | 0 | $34.24 |

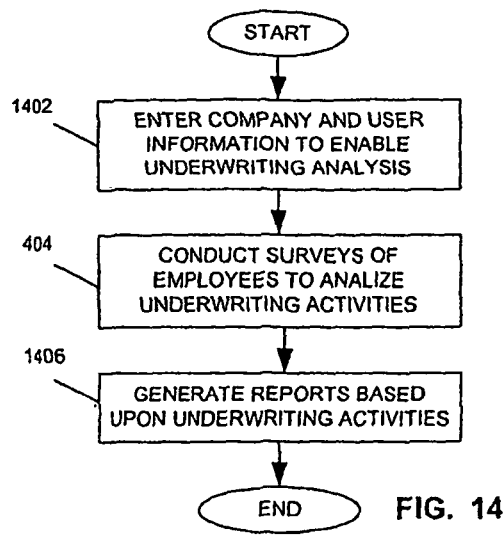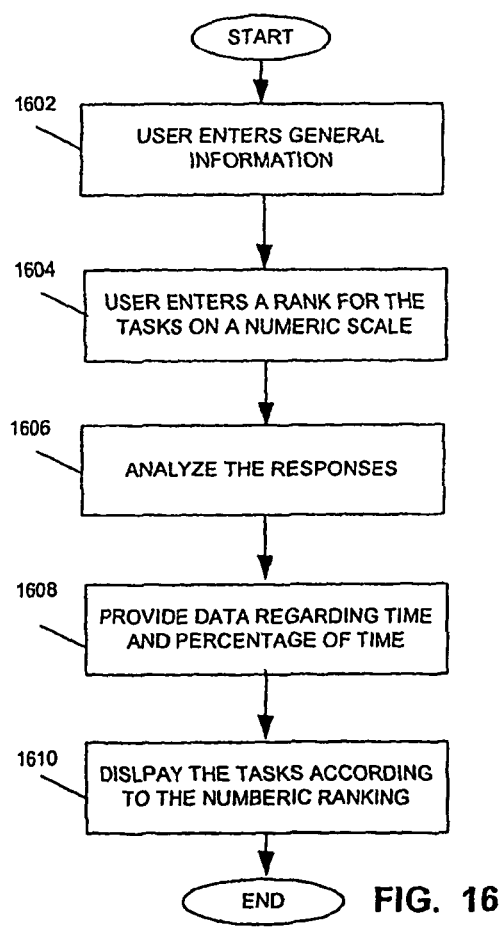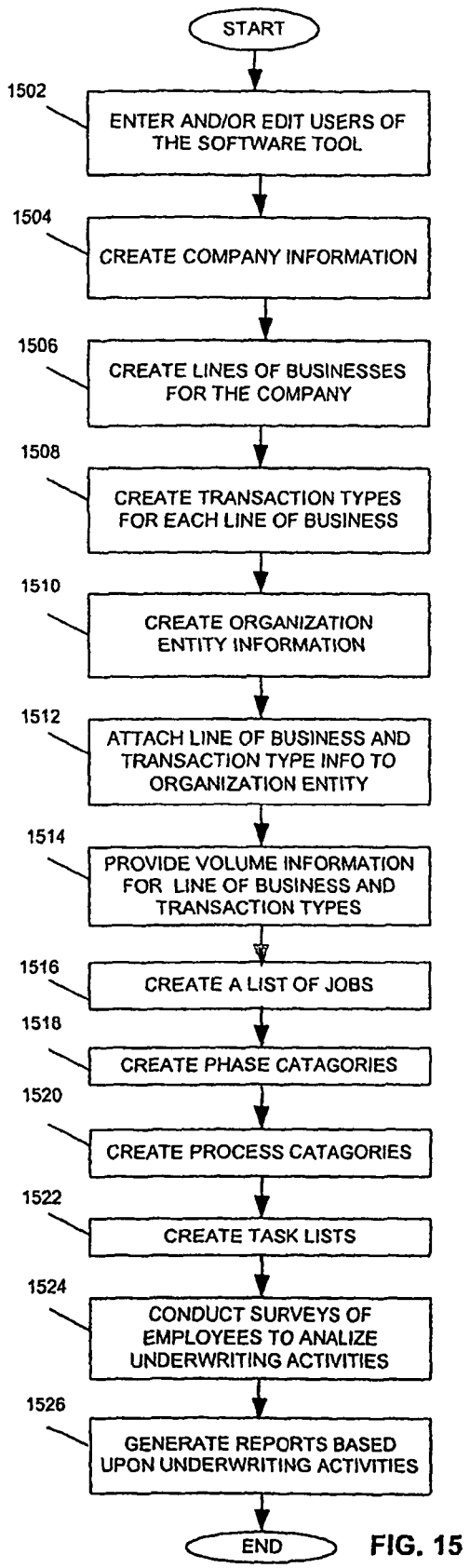
FIG. 14
FIG. 16
FIG. 15

| Example Survey Data | | Calculations | | | | | |
|---|---|---|---|---|---|---|---|
| Task | Rank | Hours Per Week | Square of Rank =Rank*Rank | FTE % of overall time Square of Rank / Sum of all Square of Rank | Hours Per Month =FTE * Hours per Week * 4 | Minutes Per Day =FTE * (Hours / Week /5) * 60 | Hours Per Day =FTE * Hours Per Week |
| #1 | 1 | 40 | 1 | 2% | 2.76 | 8.28 | 0.69 |
| #2 | 1 | | 1 | 2% | 2.76 | 8.28 | 0.69 |
| #3 | 1 | | 1 | 2% | 2.76 | 8.28 | 0.69 |
| #4 | 2 | | 4 | 7% | 11.03 | 33.10 | 2.76 |
| #5 | 2 | | 4 | 7% | 11.03 | 33.10 | 2.76 |
| #6 | 2 | | 4 | 7% | 11.03 | 33.10 | 2.76 |
| #7 | 3 | | 9 | 16% | 24.83 | 74.48 | 6.21 |
| #8 | 3 | | 9 | 16% | 24.83 | 74.48 | 6.21 |
| #9 | 3 | | 9 | 16% | 24.83 | 74.48 | 6.21 |
| #10 | 4 | | 16 | 28% | 44.14 | 132.41 | 11.03 |

Fig 19

ACTIVITY BASED COSTING UNDERWRITING TOOL

FIELD OF THE INVENTION

The present invention relates generally to computer systems and software tools for an analyzing data, and in particular, to a system and method for evaluating underwriting activities.

BACKGROUND OF THE INVENTION

As competition in an industry increases, companies attempt to reduce costs while improving customer service. For example, insurance companies work to improve service to policyholders while reducing the costs associated with all aspects of its insurance business. Insurance companies may wish to reduce the time required to perform underwriting activities to improve overall operating efficiency. In order to increase operating efficiency, a company can employ computer systems and software tools to analyze various tasks performed by employees.

One way to evaluate activities is by developing an employee survey. By understanding how employees spend their time, the company can determine the costs associated with specific tasks or activities performed by the employees. For example, an insurance company could survey its employees to determine the cost of performing underwriting activities.

The utility of the survey results depends on the survey questions and the accuracy of employee responses. It is therefore desirable to develop a method that provides flexibility in creating a survey and a user-friendly mechanism for administering the survey. Further, when evaluating a specific aspect of a company's activities, such as underwriting activities of an insurance company, it is beneficial to evaluate the activities in view of relevant categories of tasks associated with the activity. Such categories provide greater flexibility in analyzing data and generating reports.

Accordingly, there is a need for a method of and system for evaluating underwriting activities.

SUMMARY OF THE INVENTION

An embodiment of the present invention relates to a method of evaluating underwriting activities of a company providing insurance coverage. The method comprises the steps of storing data related to the underwriting activities for the company; receiving information from employees related to tasks associated with the underwriting activities; analyzing the information from the employees; and generating a report based upon the information from employees.

According to an alternate embodiment of the present invention, a system evaluates underwriting activities for a company. The system comprises a user computer storing a program containing questions related to tasks for underwriting activities; a server coupled to the user computer to receive information entered by a plurality of users related to tasks for underwriting activities; and a report generated by the server and providing analyzed information related to responses of the plurality of users.

BRIEF DESCRIPTION OF THE DRAWINGS

FIG. 1 is a system diagram of a network employing the present invention;

FIG. 2 is a block diagram of a system according to the present invention;

FIG. 10 is a portion of an exemplary survey related to underwriting activities according to the present invention;

FIG. 13 is a portion of an exemplary report related to underwriting activities according to the present invention;

FIG. 14 is a flow chart showing a method of evaluating underwriting activities of the company according to the present invention;

FIG. 15 is a more detailed flow chart showing a method of evaluating underwriting activities according to the present invention;

FIG. 16 is a flowchart showing a method of entering information related to underwriting activities according to the present invention.

FIG. 19 is a database showing a sample calculation for generating a report related to underwriting activities according to the present invention.

DETAILED DESCRIPTION OF THE DRAWINGS

Figure 3:
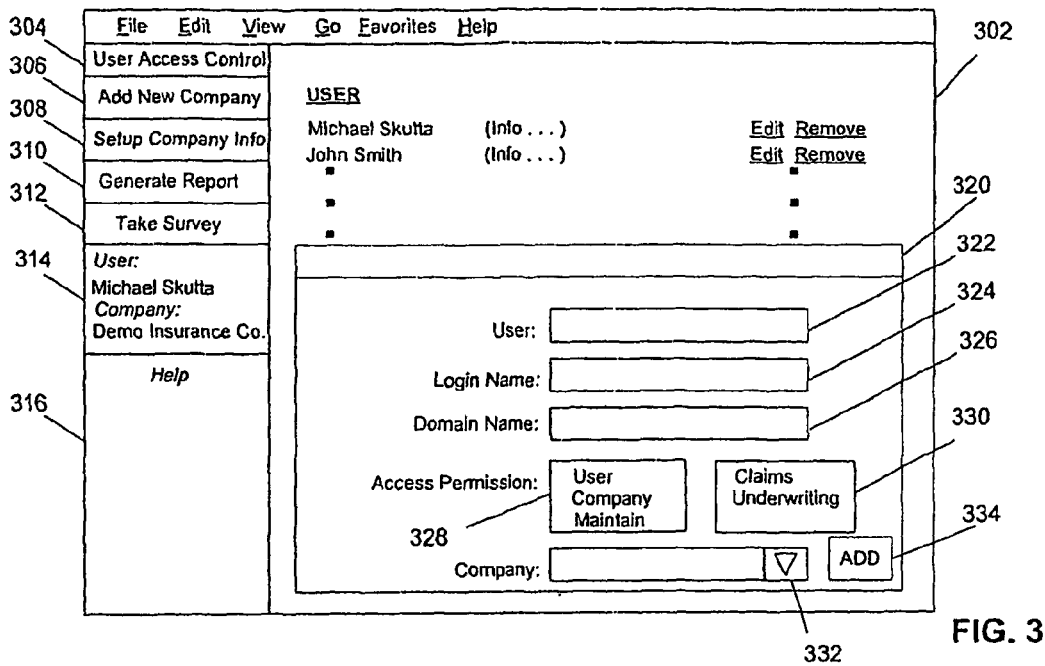
FIG. 3 is a user interface enabling user access according to the present invention.

Turning first to FIG. 1, a system diagram of a network employing the present invention is shown. In particular, a server 102 is coupled to network 104. The network 104 could be any type of communication network, such as a local area network, a wide area network, or a network enabling access to another device by way of the Internet. Server 102 communicates with a user computer 106 by way of the network 104. The network 104 could be implemented using a wireless communication network, a wireline communication network, or some combination of a wireless and wireline communication network. The method and system of the present invention also contemplates the use of portable devices, such as a portable user computer 108.

Turning now to FIG. 2, a block diagram of the system of FIG. 1 according to the present invention is shown. In particular, server 102 is coupled to a user computer 106 or portable computer 108 by way of a communication link 202. The communication link could be implemented by any wired or wireless means. For example, the communication link 202 to be implemented by the network 104, or simply by the use of a cable. Alternatively, communication between the server and the user computer could be enabled by use of portable memory devices, such as CDs or disks, accessible by an input/output port.

Server 102 comprises a control circuit 204 having a user interface 206 and coupled to a memory 208. The memory 208 preferably comprises a plurality of data files including a company profile 210, activity information 212, employee information 214, survey results 216, employee input 218, and full time equivalents (FTEs) 220. As will be described in detail later, FTE's can be calculated in real time upon demand. The memory 208 also comprises an evaluation tool 222. The evaluation tool comprises a software program for accessing the various data files of the memory 108. The various data files and function of the evaluation tool 222 will be described in more detail in reference to later figures. The control circuit 204 is also coupled to a display driver 226 and a display 228. Finally, a communication interface 230 enables communication by way of the communication link 202 with the user computer 106. Alternatively, an I/O port 232 enables the transfer of data and information by way of a memory transfer device, such as a disk or CD-ROM.

Similarly, user computer 106 and portable user computer 108 comprises a control circuit 244 having a user interface 246 and coupled to a memory 248. The memory 248 preferably comprises a plurality of corresponding data files including a company profile 250, activity information 252, employee information 254, survey results 256, employee input 258, and FTEs 260. While the data files of the server may retain information related to all users, the data file of the user computer only includes data for users of that particular user computer. The memory 248 also comprises an evaluation tool 262. The control circuit 244 is also coupled to a display driver 266 and display 268. Finally, a communication interface 270 enables communication by way of the communication link 202 with the user computer 106. Alternatively, an I/O port 232 enables the transfer of data and information.

As described above, company information 210 is collected and stored in memory 208 of server computer 102. The company information can include a total number of employees, the number of employees per office, a list of job positions in the company, the median salary for each job position, benefits costs for each job position, and the number of employees in each job position. To provide added flexibility in the survey analysis, the job positions can be assigned to a job category such as "administration" or "underwriting." Company profile information 210 is used to create the survey that is presented to the employee. In general, the survey presents a list of the tasks performed by an employee and requests the employee to assign a rank to each of the tasks based on the amount of time the employee spends on the activity. The survey creation and contents are explained in greater detail below.

Activity information 212 preferably includes a task list of all tasks, or activities, performed by employees of the company. In the task list, a company's tasks related to underwriting activities can be assigned to a line of business and/or transaction type. The task list is specific to a line of business of the company, including the company's claims and underwriting services. The nature of underwriting generally involves three different types of transaction types: new business, renewals, and endorsements. The tasks that are specific to new business are listed with a transaction type designation NB in the beginning of the task name, while renewals have a transaction type designation RE, and endorsements have a transaction type designation EN, or some other appropriate designation. Tasks which are not associated to any of the three types are listed as general with a GEN designation in the task name. A task which is done in all three transaction types should preferably appear three times in the task list, with the proper transaction type in the task description. Each task is also preferably designated as core or non-core. A core task directly affects the underwriting decision, while a non-core task leads to the underwriting decision. The task list can be modified within the tool using the edit button. Once the general task list has been modified it must be updated in the tool.

Certain information will need to be determined and gathered in order to be entered into the evaluation tool of the present invention, including process and phase categories. Processes and phase categories are various activities which may be performed for a given transaction type, or all transaction type, are preferably selected to enable benchmarking. Tasks which fall under the general phase categories (i.e. administration, book/producer management, correspondence, and supervision) can be placed under the general process category since they are not specifically associated as being either a new business, endorsement, or renewal task.

Examples of phase and process categories related to underwriting activities are shown below.

Phase Categories:
   1. Account Initiation
   2. Administration
   3. Book and Issue Policy
   4. Book/Producer Management
   5. Correspondence
   6. Customer Service
   7. Identify and Evaluate Exposure
   8. Make Underwriting Decision
   9. Negotiate
   10. Set Price and Premium
   11. Supervision Process Categories:
   1. AI_Endorsements (Account Initiation)
   2. AI_New Business
   3. AI_Renewal
   4. BIP_Endorsements (Book and Issue Policy)
   5. BIP_New Business
   6. BIP_Renewal
   7. CS_Endorsements (Customer Service)
   8. CS_New Business
   9. CS_Renewal
   10. IEE_Endorsements (Identify and Evaluate Exposure)
   11. IEE_New Business
   12. IEE_Renewal
   13. MUD_Endorsements (Make Underwriting Decision)
   14. MUD_New Business
   15. MUD_Renewal
   16. N_Endorsements (Negotiate)
   17. N_New Business
   18. N_Renewal
   19. SPP_Endorsements (Set Price and Premium)
   20. SPP_New Business
   21. SPP_Renewal
   22. General In addition to the task list, activity information 212 can include the company name, total number of employees, claim volume, claim types, organizational entities, etc. Organizational entities, e.g., "Chicago North Clark Office, Unit A," describe the structural units of a company with great flexibility. The company is not limited to traditional, rigid descriptions, e.g., headquarters or branch office, but can group its activities and employees into any organizational scheme for purposes of the survey. The survey can then be administered to employees in select organizational entities, or the survey results can be reported and the organizational entity level.

The memory 208 also includes employee information 214, which can include information related to different companies, and can be itemized for individual companies. Finally, memory 208 contains survey results 216 based upon employee input 218 entered in response to the survey. Except for information entered in the exemplary survey of FIG. 10 or user interface of FIG. 11, the information related to various companies and employees is preferably entered by an operator, which could be for example a computer or information technology specialist. The employee or user participating in the survey enters specific information related to his or her tasks, as described in reference to FIGS. 10 and 11.

Turning now to FIG. 3, a user interface enabling user access according to the present invention is shown. In particular, a user interface 302, such as a window or web page displayed on a computer, enables an operator to access the evaluation tool of the present invention. An operator can access various features by selecting the feature by way of the user interface. For example, an operator can select a User Access Control feature 304, an Add New Company feature 306, a Set Up Company Information feature 308, and Generate Report feature 310, or a Take Survey feature 312. The user interface also preferably provides information regarding a current user in a user field area 314. Finally, a help area 316 provides information accessible by the operator to enable use of the evaluation tool. The various features described above are preferably available in any of the user interfaces, as shown in FIGS. 4-8.

Also shown in FIG. 3 is a plurality of user entry fields. In particular, a user entry window 320 comprises a user field 322, a login field 324, and a domain name field 326. These fields enable an operator to set up the proper information for a user of the evaluation tool. That is, in addition to enabling a user to access the evaluation tool by entry information related to the user, the operator can also enter information related to access permission by selecting various fields in an access permission field 328. Similarly, the operator can indicate whether the user is involved in claims or underwriting by selecting the appropriate fields in the function field 330. Accordingly, the various tasks associated with claims or underwriting, for example, would automatically be accessed for that user's survey. That is, a users survey would automatically be populated with tasks associated with the particular services of an insurance business, such as claims or underwriting service. Finally, the operator can select an appropriate company in the company field 332. As shown above the window 320, previously entered users are displayed. The operator has the option to edit or remove these users as desired.

Figure 4:
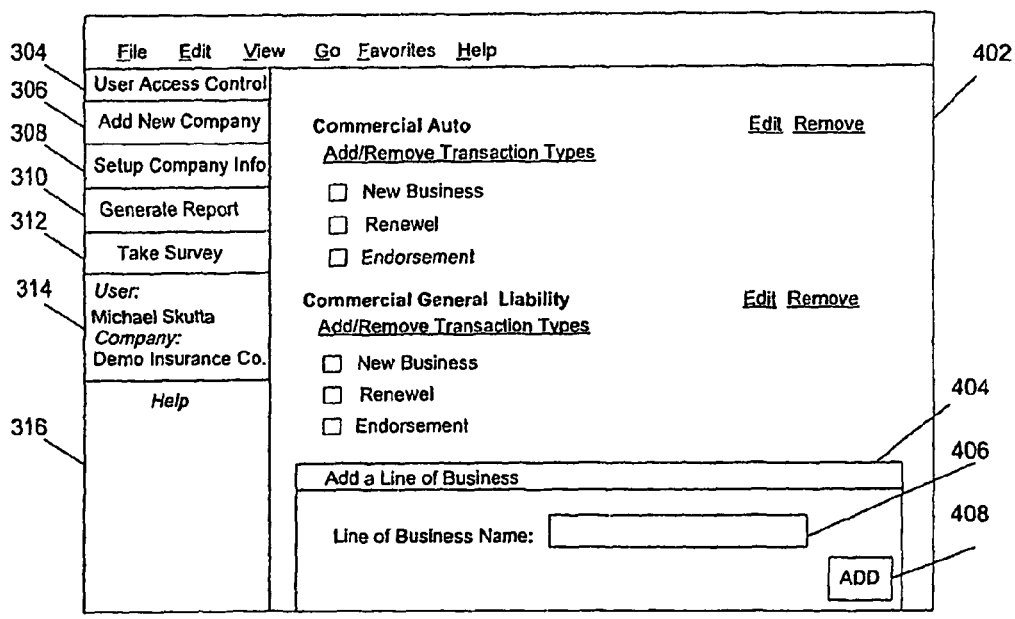
FIG. 4 is a user interface for creating a line of business according to the present invention.
Figure 5:
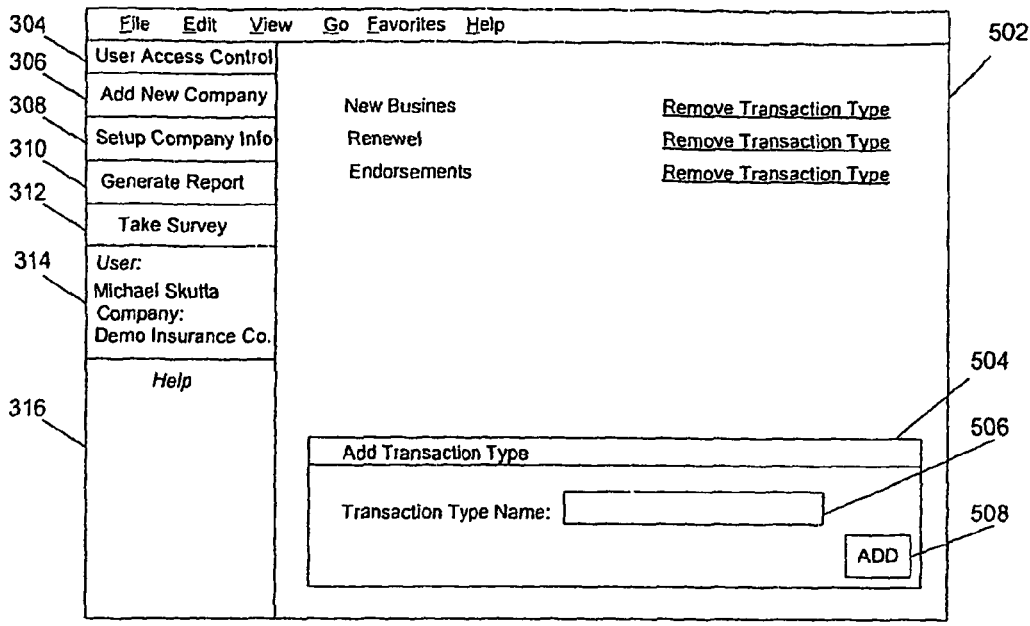
FIG. 5 is a user interface for creating a transaction type according to the present invention.

Turning now to FIG. 4, a user interface for creating a line of business according to the present invention is shown. Because different insurance companies and/or offices of an insurance company provide different insurance coverage, it is desirable to add a line of business associated with the insurance company. As shown in the user portion 402, an operator can add a line of business related to an insurance company by accessing an entry field 404. In particular, the operator enters the line of business in the user entry field 406, and adds the line of business by selecting the add button 408. Because underwriting is performed for different transactions, it is desirable to indicate the type of transaction for a given line of business. Accordingly, the various transaction types are preferably provided under the line of business, as shown in FIG. 4. An operator can also access a user interface for creating a transaction type according to the present invention, as shown in FIG. 5. In particular, a transaction type name can be entered in a user entry field 506. These can then be selected by an add button 508 to enter the new transaction type. As shown above, three transaction types are included. In particular, new business, renewal, and endorsement transaction types are shown. The operator can select to remove the transaction type if desired.

Figure 6:
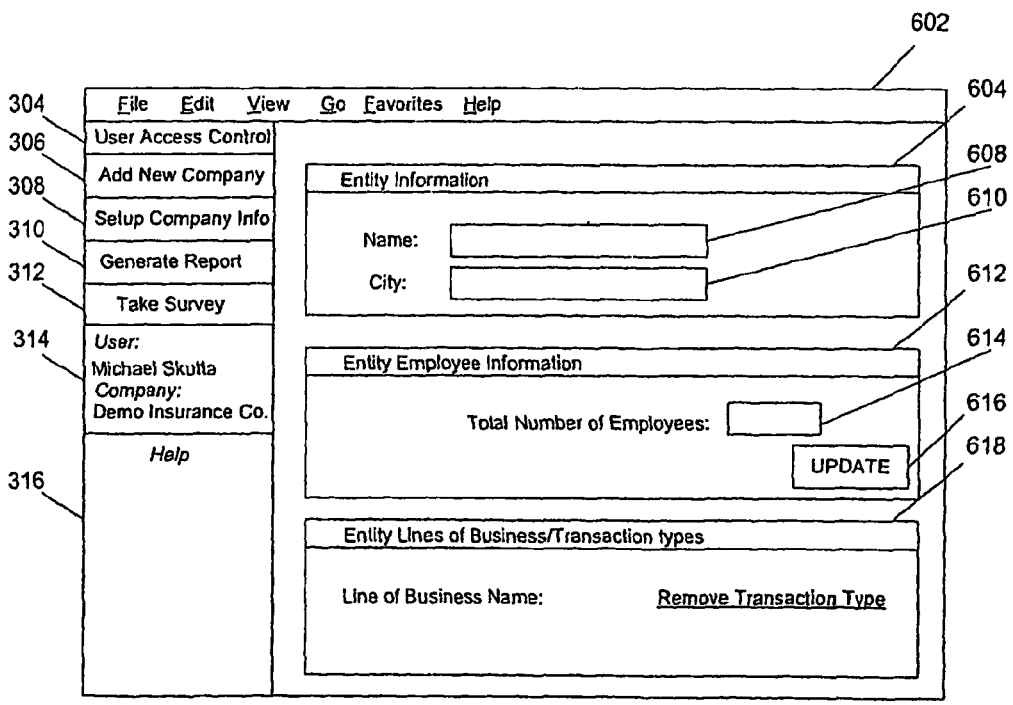
FIG. 6 is a user interface for entering organizational entity information according to the present invention.
Figure 7:
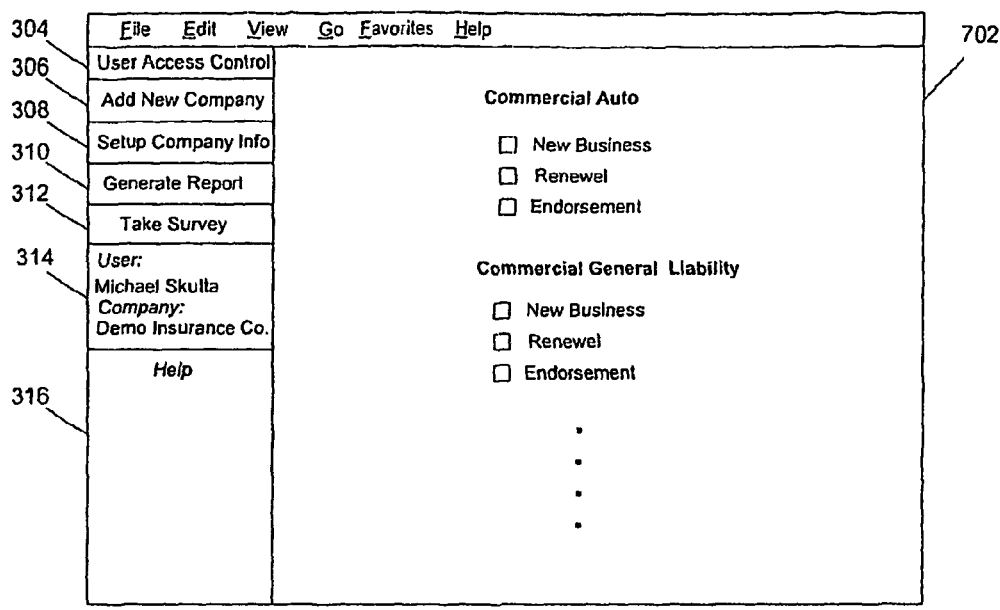
FIG. 7 is a user interface for attaching transaction types to organizational entities according to the present invention.

Turning now to FIG. 6, a user interface for entering organizational entity information according to the present invention is shown. In particular, an operator can enter information in entity information window 604. The operator can enter the name and city in entry fields 608 and 610. The operator can also enter entity employee information in a window 612. The operator can enter the total number of employees in an entry field 614, and update the employee information by selecting the update button 616. The operator can then enter lines of business and transaction types associated with the entity in a window 618. As shown in FIG. 7, a user interface 702 for attaching transaction types to lines of businesses according to the present invention is shown. In particular, a user can select a transaction type by selecting a box associated with a line of business.

Figure 8:
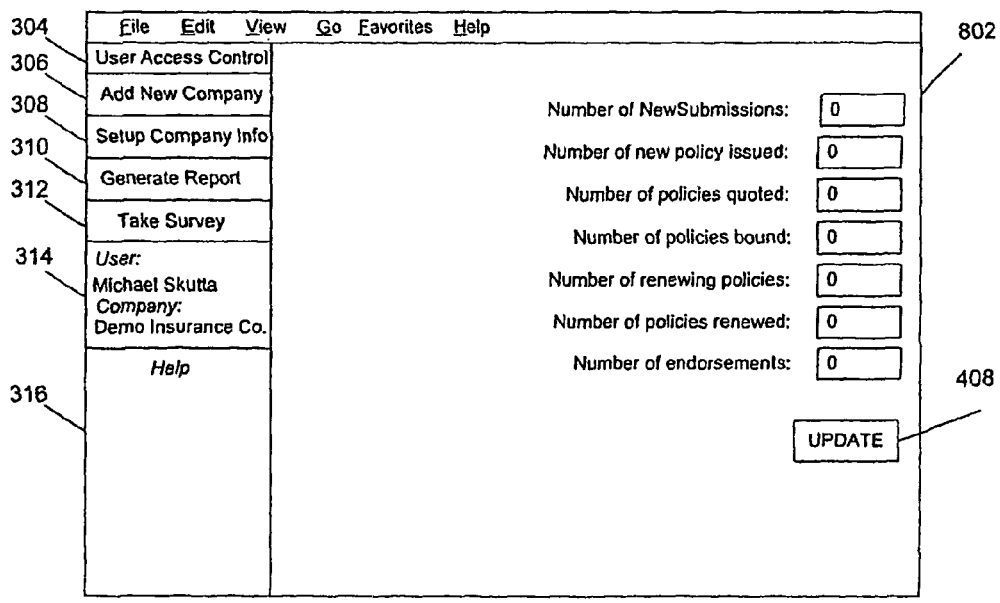
FIG. 8 is a user interface for entry volume information for transaction types according to the present invention.

Turning now to FIG. 8, a user interface 802 for entry of volume information for transaction types according to the present invention is shown. In particular, an operator can enter information related to the number of new submissions, new policies, policies quoted, policies bound, renewing policies, policies renewed, and endorsements. This information can be entered at the office level or at the company level. The operator can then update by selecting the update button 804.

Figure 9:
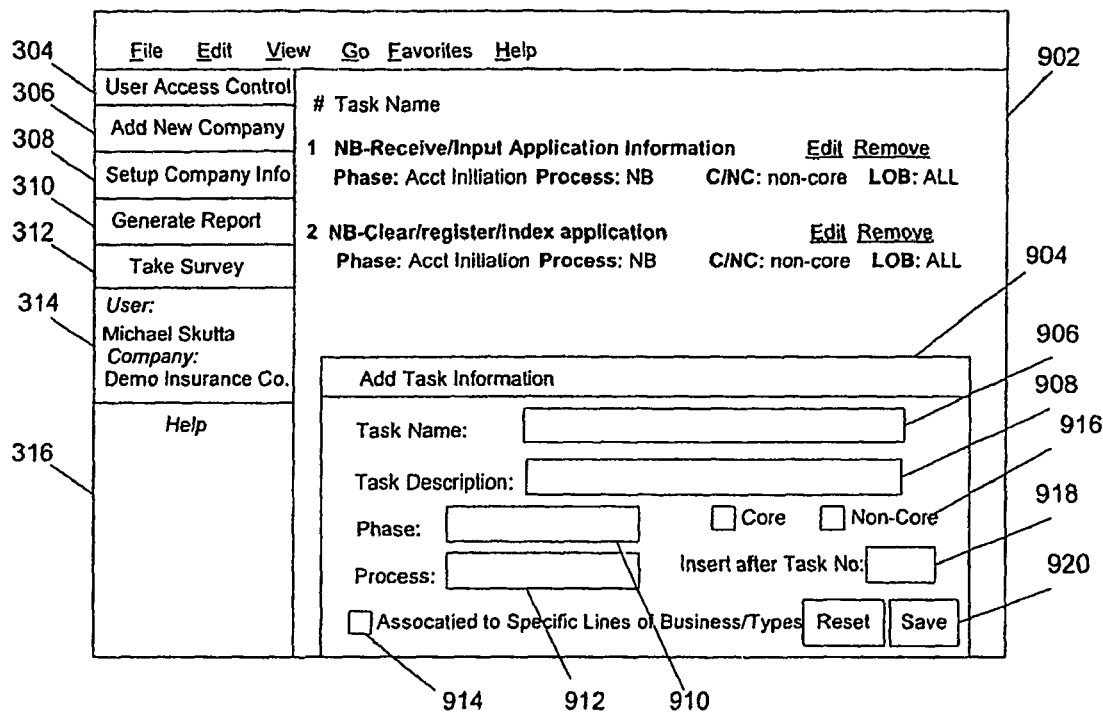
FIG. 9 is a user interface for entering task information according to the present invention.

Turning now to FIG. 9, a user interface 902 for entering task information according to the present invention is shown. In particular, an Add Task Information field 904 includes a number of entry or selection fields, including a Task Name field 906, a Task Description field 908, a Phase field 910, a Process field 912. An operator can also select to indicate that the task is associated with a specific line of business by selecting a box 914, or indicated that the task is a core or non-core task by selecting a core or non-core designation 916. The operator can also indicate where the task should be positioned in the list of task by entering a task number in a field 918, and saving or resetting the task by selecting a save button 920 or reset button 922. Tasks associated with other aspects of the insurance business, such as claims, for example, could also be entered according to the present invention. As described above, the various tasks associated with various services of an insurance company, such as claims or underwriting, are used to populate a survey responded to by a user depending upon the user's participation in an aspect of that business.

Turning now to FIG. 10, a portion of an exemplary survey related to underwriting activities according to the present invention is shown. In particular, the exemplary survey of FIG. 10, is preferably a paper survey which enables a user to respond to an initial survey to simplify the electronic survey. The user preferably enters general information regarding his or her identity and background. The user then answers a plurality of questions. The questions could be numbered and describe a particular task and subtask. The user can then enter whether the task is performed. If the task is performed, the user can then indicate whether the task is a significant task in terms of volume, for example by indicating high, medium or low. The user then ranks the task from 1-15. For example, tasks categorized as high would be given a numeric ranking between 11-15, tasks categorized as medium would be given a numeric ranking between 6-10, and tasks categorized as low would be given a numeric ranking between 1-5. By first indicating whether a task is given a high, medium or low designation, it is easier for a user to give a numeric ranking required by the electronic survey described in reference to FIG. 12. By enabling simple criteria for characterizing transaction types for underwriting activities, the results of the survey can provide significant information. One benefit of employing a paper survey prior to entering information on an electronic survey is that a user does not need to read questions that were not designated as a task that they completed. Accordingly, the users will need less computer time to complete the electronic survey, thereby minimizing the requirements for computer resources.

Figure 11:
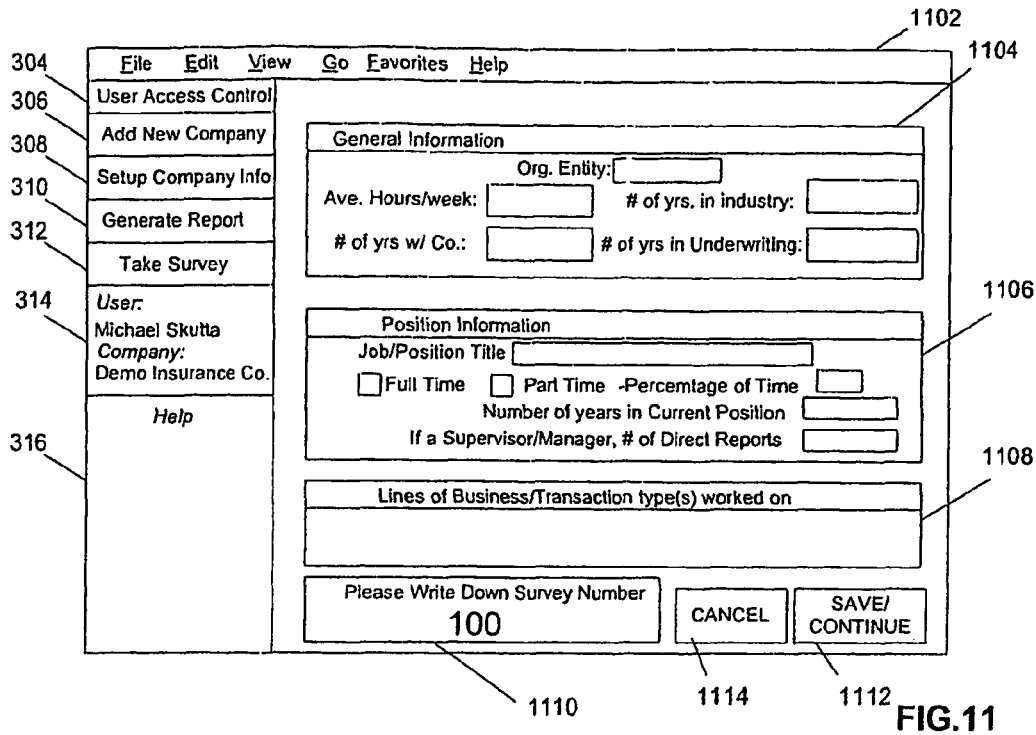
FIG. 11 is a user interface enabling a user to access an electronic survey according to the present invention.

Turning now to FIG. 11, a user interface 1102 enabling a user to access an electronic survey according to the present invention is shown. In particular, a user enters general information in an information field 1104. The information could include, for example, the user's organizational entity, the average hours worked per week, the number of years in the industry, the number of years with the company, and the number or years in underwriting, for example. The user could also enter specific information related to the user's position in a field 1106. This information could include a job title, whether the job is full time or part time (including the percentage of time if part time), the number of years in the current position, and the number of direct reports if a manager or supervisor. A user could also enter lines of businesses or transaction types in a field 1108. Also, a "pop-up" box 1110 could appear in response to the selection of a save/continue button 1112. The pop-up box 1110 provides a user number, such as 100 as shown, enabling a user to login to the survey to avoid having to re-enter the information if the survey is interrupted or terminated early. Finally, a cancel button 1114 could be selected to return to a previous screen.

Figure 12:
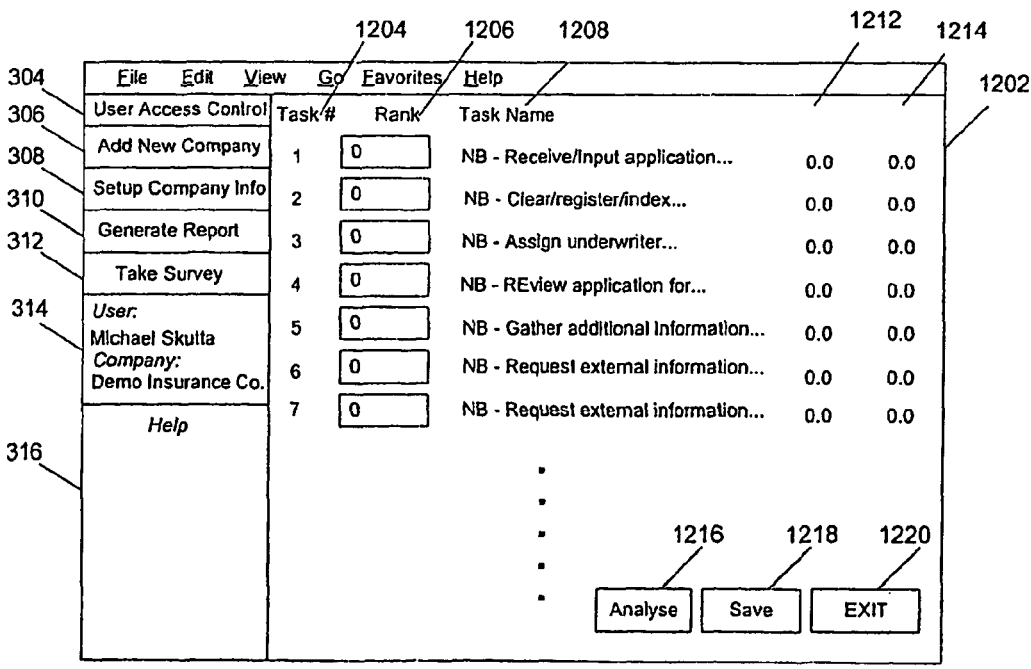
FIG. 12 is a user interface for entering task data according to the present invention.

Turning now to FIG. 12, a user interface for entering tasks according to the present invention is shown. In particular, various tasks associated with a line of business are listed numerically in a task number column 1204, enabling a user to enter a rank in a rank column 1206 associated with the description in a task name column 1208. Preferably, any of the selection options or fields of any of the user interfaces described would include a "mouse over" feature, whereby additional information regarding the selection option or field would be provided when the operator or user would use a computer mouse to place an arrow over the selection option or field, without selecting the option or field. Finally, information regarding hours allocated to the task, such as hours per week, or percentage of time can be shown in columns 1212 and 1214, respectively, in response to the selection of the analyse button 1216 or a save button 1218, which would also same the results. By selecting the rank column, the tasks are sorted according to the rank the user input into the fields starting with the largest ranks at the top of the list. Enabling the user to view all the tasks that are of the same rank and determine if they all take relatively the same amount of time to complete. By selecting the Task # column, the tasks will be sorted based on the task number starting with task #1 for easy reference in relation to the paper survey. Finally, the user could end the survey by selecting an exit button 1220.

Turning now to FIG. 13, a portion of an exemplary report related to underwriting activities according to the present invention is shown. In particular, the exemplary report would be categorized by the task, as described above. The report would also indicate whether the task was a core or non-core task. The report would preferably indicate a percentage of time spent any particular task, the FTE, and the costs associated with performing the task. Each phase would preferably be totaled. For example, a total for the account initiation phases would be provided as shown in FIG. 13. Although certain categories are shown, other information could be included in the report according to the present invention.

Turning now to FIG. 14, a flow chart shows a method of evaluating underwriting activities of the company according to the present invention. In particular, company and user information is entered to enable underwriting analysis at a step 1402. Surveys of employees are conducted to analyze underwriting activities in a step 1404. Finally, reports are generated based upon underwriting activities at a step 1406.

Turning now to FIG. 15, a more detailed flow chart shows a method of evaluating underwriting activities according to the present invention. In particular, users of the evaluation tool are entered and/or edited at a step 1502. Company information is also entered at a step 1504. Lines of businesses for the company are created at a step 1506. Transaction types for a business are created a step 1508. For example, transaction types for underwriting activities could include new business, renewals, or endorsements. Organizational entity information is created at a step 1510. A line of business and transaction type information is attached to the organizational entity at a step 1512. Volume information for the line of business and transaction types is provided at a step 1514. A list of jobs is created at a step 1516. Phase categories are created at a step 1518. Process categories are created at a step 1520. A task list is created at a step 1522. Surveys are conducted of employees to analyze underwriting activities at a set 1524. Finally, reports are generated based upon underwriting activities in a step 1526.

Turning now to FIG. 16, a flowchart shows a method of a user entering information related to underwriting activities according to the present invention is shown. In particular, a user enters general information in at a step 1602. The user then enters a rank for a task on a numeric scale at a step 1604. Responses are then analyzed at a step 1606. Data regarding time and percentage of time on designated tasks is then provided at a step 1608. Tasks can then be displayed according to the amount of time spent on a task at a step 1610.

Figure 17:
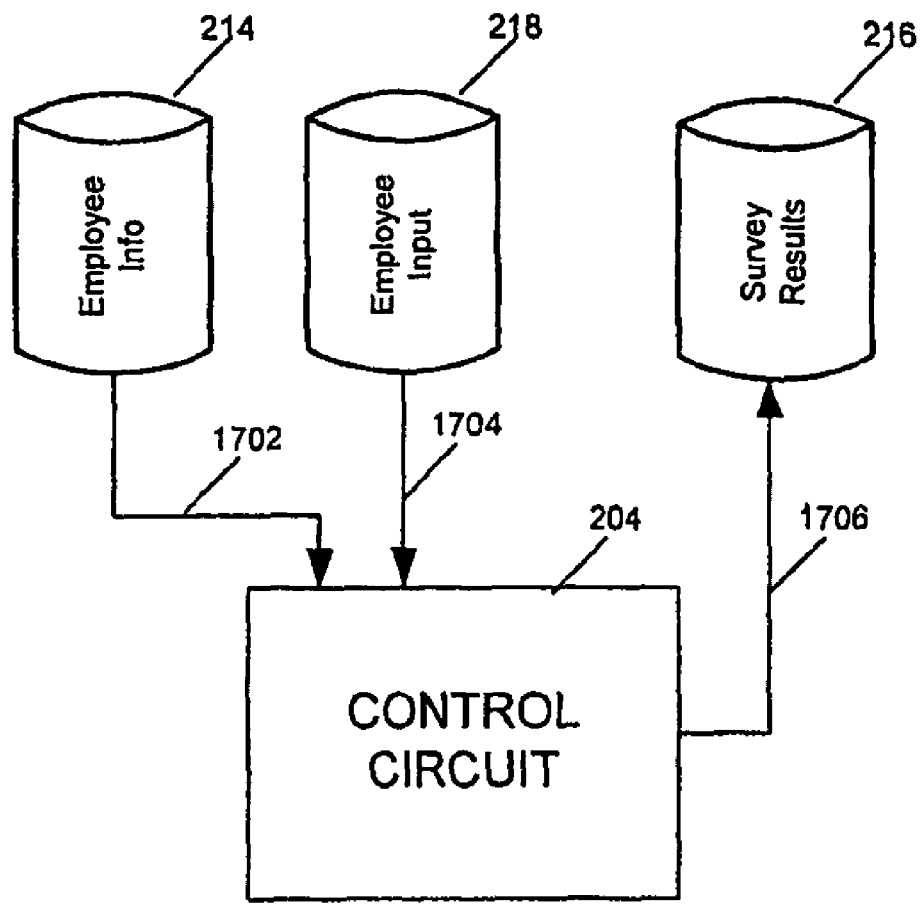
FIG. 17 is a block diagram showing the data files accessed to generate a report according to the present invention.

Turning now to FIG. 17, a block diagram shows the data files accessed to generate a report according to the present invention. In particular, data 1702 from a first database comprising employee information 214 is combined with data 1704 from a second database comprising employee input 218 in the control circuit 214 to generate output data 1706. The data 1702 could comprise information entered for the user, for example information entered in FIG. 3 during the set up of employee data. The data 1704 could be information entered by the employee, for example information entered by the employee in FIG. 11. Data provided by the control the control circuit would include at least salary information and other costs associated with the employee provided by the employee and/or the employer, as well as ranking data related to tasks provided by the employees.

Figure 18:
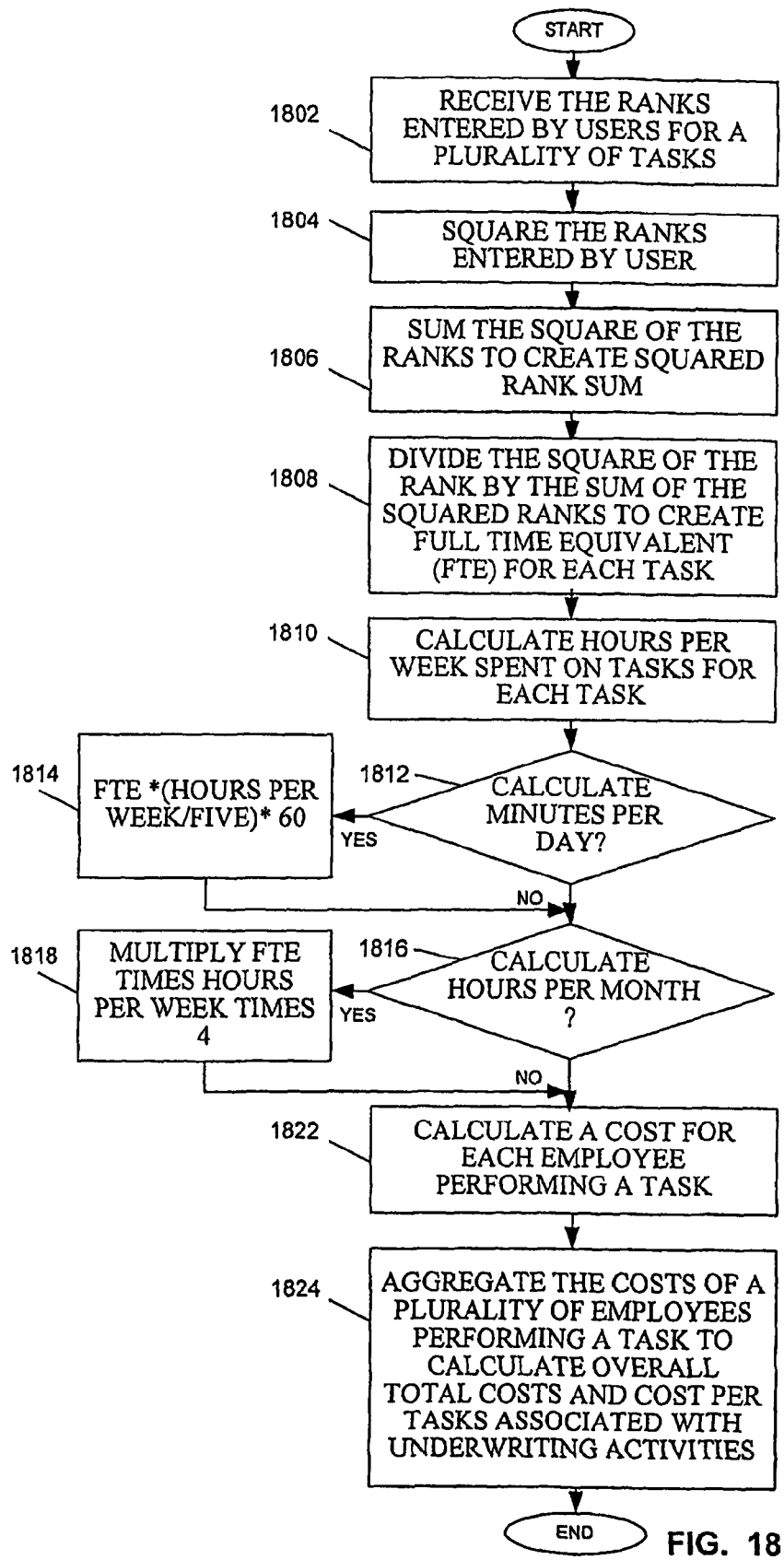
FIG. 18 is a flow chart showing a method for generating a report related to underwriting activities according to the present invention.

Turning now to FIG. 18, a more detailed flow chart a method for generating a report related to underwriting activities according to the present invention. The ranks entered by users for a plurality of tasks are received at a step 1802. The ranks entered by user are squared at a step 1804. The squares of each rank are summed to create squared rank sum at a step 1806. The square of the rank is divided by the sum of the squared ranks to create full time equivalent representing a percentage of time spend on a task at a step 1808. The hours per week an employees spends on particular tasks is calculated for each task by multiplying the fill time equivalent by the typical work week, such as 40 hours, at a step 1810. An example calculation showing the calculation of a full time equivalent and other desired report data is shown in FIG. 18. It is then determined whether minutes per day is desired to be calculated at a step 1812. If so, the hours per week for a task is divided by five and multiplied by 60 at a step 1814. It is also determined whether hours per month is desired to be calculated at a step 1716. If so, the hours per week is multiplied by 4 at a step 1818. A cost for each employee performing a task is then calculated at a step 1820. The cost is calculated based upon the amount of time spent on a task multiplied by the employees salary, or an average salary for a certain grade level for the employee. Finally, the costs are aggregated to determine the costs of a plurality of employees performing a task, and to calculate overall total costs associated with underwriting activities at a step 1822. That is, the amount of time spent by each employee on a give task is multiplied by the cost per time unit for that employee (or average cost for that level employee, and the costs related to a task for all of the employees is aggregated.

Turning now to FIG. 19, a database showing a sample calculation for generating a report related to underwriting activities according to the present invention is shown. As can be seen in this example, 10 tasks are listed, and the employee ranked the first three tasks with a one, the second three tasks with a two, the third three tasks with a three and the last task with a 4. A square of the rank is then generated, and a full time equivalent is calculated by dividing the square of the rank by the sum of all of the squares of the ranks. Finally, hours per month and minutes per day can be calculated and put into a report. Costs for the insurance company completing various tasks can then be calculated for a given period by multiplying the amount of time spent during that period by the employee's salary or average salary for the employee's level. The costs for the specific tasks as well as overall underwriting costs can be determined by aggregating the costs for a desired category (i.e. a specific task or group of tasks) over a given period.

It can therefore be appreciated that the new and novel method of evaluating underwriting activities has been described. It will be appreciated by those skilled in the art that, given the teaching herein, numerous alternatives and equivalents will be seen to exist which incorporate the disclosed invention. As a result, the invention is not to be limited by the foregoing embodiments, but only by the following claims.

The invention claimed is:

1. A method of evaluating underwriting activities of a company providing insurance coverage, said method comprising:
    receiving input as to a transaction type, the transaction type selected from a plurality of transaction types of underwriting activities;
    determining tasks associated with the selected transaction type;
    receiving from each of a plurality of employees a task-rank for each of the tasks associated with the selected transaction type, including a first task-rank from at least one of each of the plurality of employees corresponding to a first task, wherein each of the task-ranks falls within a numerical range;
    calculating, using a computer processor, the time spent on each of the tasks based upon the corresponding task-ranks received from the at least one of each of the plurality of employees, such that the time spent on the first task is a function of a square of the first task-rank divided by a sum of the squares of each of the task-ranks corresponding to the tasks associated with the selected transaction type, further multiplied by a predetermined number of time units;
    accessing cost data related to employees performing said underwriting activities for said company from a memory;
    determining a cost associated with each of the tasks that are associated with the selected transaction type based on said cost data and said time spent; and
    generating a report comprising the determined cost associated with each of the tasks.

2. The method of claim 1 wherein calculating the time spent comprises calculating a number of hours per week on a task.

3. The method of claim 1 wherein calculating the time spent comprises calculating a number of hours per month on a task.

4. The method of claim 1 wherein calculating the time spent comprises calculating a number of minutes per day on a task.

5. The method of claim 1 wherein calculating a cost associated with a task comprises aggregating the cost associated with the task for the plurality of employees.

6. The method of claim 1 wherein the plurality of transaction types comprises new business, renewals and endorsements.

7. The method of claim 1 wherein the tasks associated with the selected transaction type are designated as a core task or a non-core task, the core task comprising directly affecting the underwriting activity, the non-core task leading to the underwriting activity; and
    wherein the report further indicates whether each of the tasks associated with the selected transaction type is a core task or a non-core task.

8. A method of evaluating underwriting activities of a company providing insurance coverage, said method comprising:
    receiving input as to a transaction type, the transaction type selected from a plurality of transaction types of underwriting activities;
    determining tasks associated with the selected transaction type;
    receiving from each of a plurality of employees a task-rank for each of the tasks associated with said selected transaction type, including a first task-rank from at least one of each of the plurality of employees corresponding to a first task, wherein each of the task-ranks falls within a numerical range;
    calculating, using a computer processor, time spent on each of the tasks based upon the corresponding task-rank received from the at least one of each of the plurality of employees, such that the time spent on the first task is a function of a square of the first task-rank divided by a sum of the squares of each of the task-ranks corresponding to the tasks associated with the selected transaction type, further multiplied by a predetermined number of time units;
    accessing salary data related to employees performing said underwriting activities for said company from a memory;
    calculating a cost associated with each of the tasks that are associated with the selected transaction type based on said salary data and said time spent;
    aggregating the cost associated with each of the tasks for a plurality of employees; and
    generating a report based upon said time spent and said aggregated costs.

9. A system to evaluate underwriting activities of a company providing insurance coverage, the system comprising:
    a memory to store cost data related to employees performing said underwriting activities for said company;
    an input device to receive input as to a transaction type, the transaction type selected from a plurality of transaction types of underwriting activities; and a computer processor in communication with the memory and the input device, the computer processor configured to:
determine tasks associated with the selected transaction type,
receive from each of a plurality of employees a task-rank for each of the tasks associated with the selected transaction type, including a first task-rank from at least one of each of the plurality of employees corresponding to a first task, wherein each of the task-ranks falls within a numerical range,
calculate the time spent on a task based upon the corresponding task-rank received from the at least one of each of the plurality of employees, such that the time spent on the first task is a function of a square of the first task-rank divided by a sum of the squares of each of the task-ranks corresponding to the tasks associated with the selected transaction type, further multiplied by a predetermined number of time units,
determine a cost associated with each of the tasks that are associated with the selected transaction type based on said cost data and said time spent; and
generate a report comprising the determined cost associated with each of the tasks.

10. The system of claim 9 wherein the computer processor is configured to calculate the time spent by calculating a number of hours per week on a task.

11. The system of claim 9 wherein the computer processor is further configured to calculate a cost associated with a task.

12. The system of claim 11 wherein the computer processor is configured to calculate cost associated with a task by aggregating the cost associated with the task for the plurality of employees.

13. The system of claim 9 wherein the plurality of transaction types comprises new business, renewals and endorsements.

14. The system of claim 9 wherein the tasks associated with the selected transaction type are designated as a core task or a non-core task, the core task comprising directly affecting the underwriting activity, the non-core task leading to the underwriting activity; and
wherein the report further indicates whether each of the tasks associated with the selected transaction type is a core task or a non-core task.

* * * * *

UNITED STATES PATENT AND TRADEMARK OFFICE
CERTIFICATE OF CORRECTION

PATENT NO. : 8,386,346 B2
APPLICATION NO. : 10/546973
DATED : February 26, 2013
INVENTOR(S) : Magner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2168 days.

Signed and Sealed this
First Day of September, 2015

Michelle K. Lee
*Director of the United States Patent and Trademark Office*